United States Patent [19]

Garabedian

[11] 4,121,835
[45] Oct. 24, 1978

[54] SOUND PRODUCING STRAW

[76] Inventor: George V. Garabedian, P.O. Box One, Anaheim, Calif. 92805

[21] Appl. No.: 828,098

[22] Filed: Aug. 26, 1977

[51] Int. Cl.² .......................... G11B 1/04; G11B 3/00; G11B 7/24; A47G 21/18
[52] U.S. Cl. .................................... 274/1 R; 138/121; 138/178; 206/217; 206/307; 215/239; 229/75; 239/33; 274/11 R; 274/41 R
[58] Field of Search .................... 274/1 R, 1 A, 11 R, 274/41, 42 R, 43, 44; 138/121, 178; 46/175 R, 175 AR, 189; 239/33; 206/217, 307; 215/239; 229/75

[56] References Cited

U.S. PATENT DOCUMENTS

| D. 241,702 | 10/1976 | Arkanian | 239/33 |
| 2,042,736 | 6/1936 | Schwartz | 274/1 A |
| 2,164,663 | 7/1939 | Ottofy | 274/1 A |
| 2,574,090 | 11/1951 | Dofsen | 274/42 R |
| 2,997,306 | 8/1961 | Hicks | 274/42 R |
| 3,269,734 | 8/1966 | Ottofy | 274/42 R |
| 3,398,624 | 8/1968 | Stoessel et al. | 239/33 |
| 3,589,736 | 6/1971 | Gorman | 274/42 R |
| 3,745,055 | 7/1973 | Gorman | 274/42 R |
| 3,780,944 | 12/1973 | Zubalik | 239/33 |

*Primary Examiner*—Steven L. Stephan
*Attorney, Agent, or Firm*—Larson, Taylor and Hinds

[57] ABSTRACT

A sound producing device where a recorded sound track on the external surface of an elongate member, such as a drinking straw, produces sound as the straw is moved through a resilient lid of a container.

1 Claim, 3 Drawing Figures

U.S. Patent
Oct. 24, 1978
4,121,835
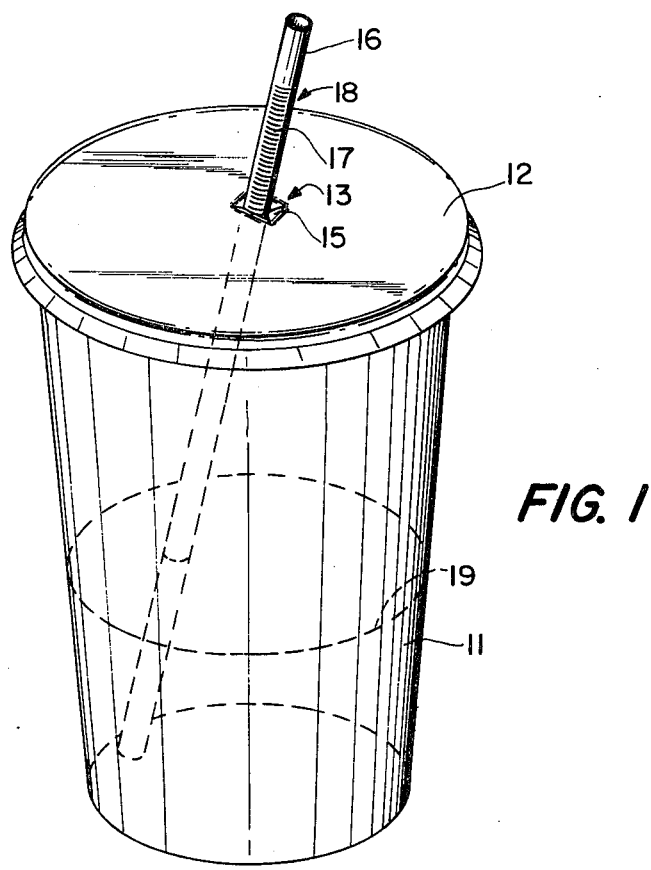
FIG. 1
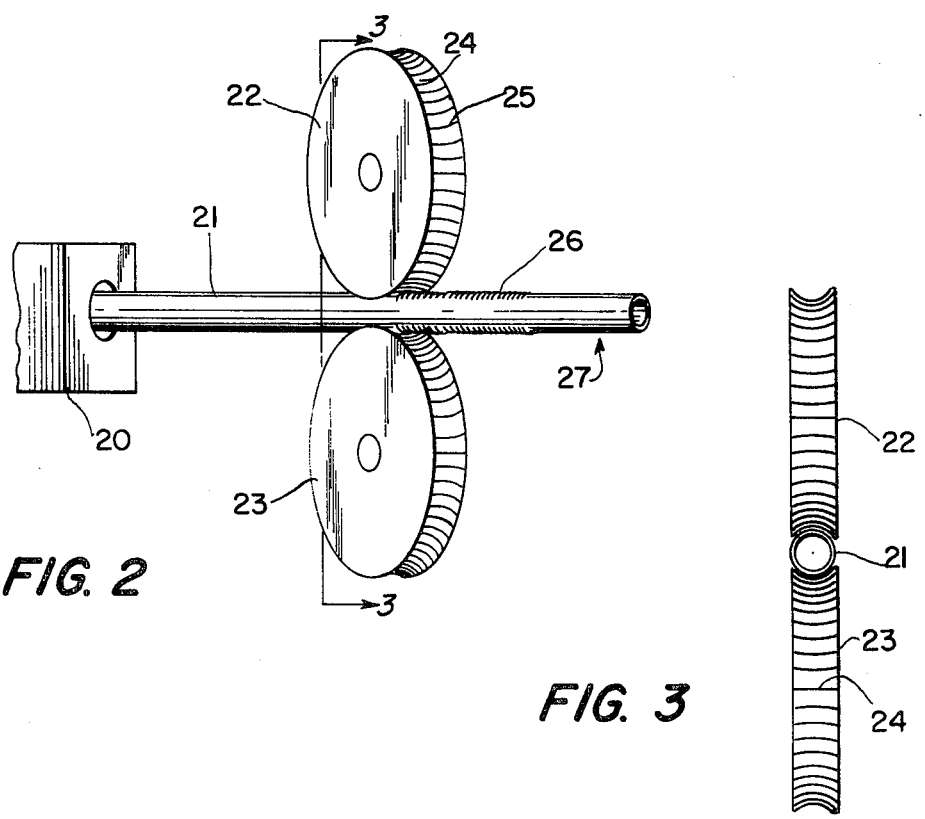
FIG. 2
FIG. 3

SOUND PRODUCING STRAW

FIELD OF THE INVENTION

This invention relates generally to the production of sound by a manually operated device and more particularly, in one embodiment, to an advertising device, novelty, or toy incorporating a covered container and a straw having a sound track incorporated thereon.

BACKGROUND OF THE INVENTION

The recording of a sound track on a strip which is hand operated to produce sound has been disclosed in the prior art. For instance, in U.S. Pat. No. 2,164,663 to Ottofy, a flat celluloid record strip was shown which could produce sound by movement of the strip relative to a display or by moving a thumbnail of an operator over the sound strip attached to the display device. The use of a thumbnail or such to produce sound as it is drawn over a sound strip attached to a sound box was also the subject of a number of U.S. patents, such as U.S. Pat. Nos. 2,165,073 and 2,042,736 to Schwartz and U.S. Pat. No. 2,060,287 to Dofsen. Another type of a hand operated device which uses a strip to produce sound is disclosed in U.S. Pat. No. 3,462,157 to Barnett et al. This device relates to an audible greeting card which has two sections relatively slidable over one another and a sound track on one of the sections. The other section has a needle connected to a speaker at one end thereof and engagable with the sound track at the other end such that a sound is produced when the two sections are slid relative to each other.

However, none of the foregoing prior art devices has a readily adaptable, repetitious functional use. In particular, except for the device disclosed in the U.S. Pat. No. 2,042,736 Schwartz patent, none of the foregoing prior art devices can both be used as an advertising or novelty device and used for a second, useful purpose which would tend to cause the device to be retained by the user after the novelty had worn off. The U.S. Pat. No. 2,042,736 Schwartz patent discloses a second use for the sound box 1 for holding candy. However, the candy must be removed to use the device and once removed, there is a small likelihood that the box would be reused. In addition, none of the foregoing prior art devices disclose a sound record on a member having alternate uses or provide an effective means for altering the pitch of the sound.

SUMMARY OF THE INVENTION

The present invention provides a novel apparatus for producing sound which overcomes the above mentioned and other disadvantages of the prior art. The present invention provides a means for altering the pitch of the produced sound and provides in one embodiment a liquid tight container with a rigidly mounted, detachable cover having an opening therein in combination with a straw having the sound track on the outside thereof.

An object of the invention is the production of sound by the relative movement between an elongate member having a prerecorded sound track in the form of ridges or undulations on the external surface of the member and a lid mounted on a container. In a preferred embodiment, the elongate member is a hollow drinking straw.

Other features, objects and advantages of the present invention are stated in or are apparent from the detailed description of a presently preferred embodiment of the invention found hereinbelow.

BRIEF DESCRIPTION OF THE DRAWINGS

FIG. 1 is a perspective view of one embodiment of the present invention comprising a covered container and a drinking straw having a sound track.

FIG. 2 is a perspective, diagrammatic view of a means for embossing a sound track on a straw.

FIG. 3 is a cross-sectional view taken along lines 3—3 in FIG. 2.

DETAILED DESCRIPTION OF THE PREFERRED EMBODIMENT

With reference now to the drawings in which like numerals represent like elements throughout the several views, a presently preferred embodiment of the present invention is depicted and comprises a liquid tight container 11 having a lid or cover 12 rigidly, but removably mounted thereon. Container 11 and lid 12 are preferably made from a thin material which can readily vibrate such as paper or plastic. Lid 12 has an aperture 13 therein. Aperture 13 is preferably the result of a T-shaped or an X-shaped slit completely through lid 12 thereby producing a plurality of resilient tabs 15. An elongate hollow member or straw 16 is shown inserted through aperture 13 of lid 12 into the interior of container 11. The exterior surface of straw 16 has a plurality of undulations or ridges 17 extending along the length thereof which together comprise a sound track 18. As can be seen in FIG. 1, tabs 15 are in resilient engagement with sound track 18 and can vibrate upon the relative movement of straw 16 and lid 12. If desired, container 11 can contain a liquid indicated by broken lines 19.

Sound track 18 in the presently preferred embodiment is affixed to straw 16 by being embossed in the straw material. The method for embossing the plurality of ridges 17 onto straw 16 is shown in FIGS. 2 and 3. A conventional extruding machine shown at 20 continuously extrudes a hollow member 21 made from a plastic material. Straws 18 are formed when hollow member 21 is cut into lengths. A pair of hollow dies 22 and 23 are rotatably mounted and movably spaced apart by means not shown. Each roller die 22 and 23 has a concave peripheral edge 24 for conformingly engaging a significant arcuate portion of the outside surface of elongate member 21. Either one or both of the peripheral edges 24 of roller dies 22 and 23 have a plurality of ridges or undulations 25 therein, and each of the roller dies 22 and 23 is preferably heated so that when member 21 is engaged therebetween, as shown in FIG. 3, a corresponding reverse set of ridges or undulations 26 is formed in hollow member 21. Roller dies 22 and 23 are preferably positionably spaced apart so that hollow member 21 can be selectively engaged to emboss ridges 26 thereon and can be selectively disengaged so as to produce a leader and trailer portion 27 which does not have any ridges. The embossing of hollow member 21 is preferably done in close proximity to extruding machine 20 so that hollow member 21 is still soft and ridges 26 can be easily formed in the surface thereof.

In the embodiment of the invention shown in FIGS. 2 and 3, both roller dies 22 and 23 have ridges 25 therein such that an identical sound track 18 can be embossed on each side of hollow member 21. In an alternative embodiment, the entire external surface of hollow member 21 can be embossed. Alternatively, sound track 18 can be embossed on a flat flexible strip which can then be permanently attached around hollow member 21.

The ridges 17 on straw 16 are spaced apart and have a radius such that a sound message can be fixed to straw 16. In operation, straw 16 is inserted through lid aperture 13 until tabs 15 engage ridges 17. As the straw is continuously, and preferably uniformly inserted into container 11, tabs 15 vibrate and in turn cause lid 12 to vibrate. Lid 12 acts as a sounding board or diaphragm and reproduces the sound or message. Ordinarily, an intelligent message or sound would be produced only by movement of the straw through the lid in one direction, either as the straw is pushed into the container or is withdrawn therefrom. Alternatively, it is possible to have one side of straw 16 embossed with a message that is playable when the straw is inserted into container 11 and have the other side of straw 16 embossed such that the sound message is reproduced when the straw is withdrawn from container 11. In this embodiment, it is clear that only one tab 15 can be engaged at a time in order to avoid distortion of the sound. Container 11 acts as a sound box having a variable effective volume depending upon the height of liquid 19 therein. In this manner, straw 16 can be inserted into a nearly full container to play the sound recording at a high frequency, some of the liquid contents 19 can be removed from container 11, and the process can be successively repeated whereby the recorded sound will be successively replayed at increasingly lower pitches.

It is believed that the present invention will greatly encourage little children to finish the beverages contained in container 11 because the child will want to hear the sound being reproduced at different pitches. Naturally, the pitch can also be varied depending upon the speed at which straw 16 is moved through lid 12.

Sound track 18 can contain almost any intelligible sound from a short musical recording to a commercial message advertising the source of the liquid contents. Because of the novelty of the device and its usefulness for a second purpose, namely for holding beverages to be consumed, the present invention provides a sound reproducing device which will be retained by its user for a long period of time. In this manner, if a commercial message were to be recorded onto sound track 18, the message would be repeatedly replayed.

Other alternative embodiments of the invention should be apparant to those of ordinary skill in the art. For instance, in order to assure a longer life for the present invention, container 11 can be made from a more rigid material, for example a thicker plastic. Similarly, lid 12 can be made from a more rigid material with tabs 15 being flexibly connected thereto.

Although the invention has been described in detail with respect to exemplary embodiments thereof, it will be understood by those of ordinary skill in the art that variations and modifications may be effected within the scope and spirit of the invention.

I claim:

1. A sound producing device comprising, in combination, an open topped container having a closed bottom and sidewall forming a cup shape for holding liquid, a lid retained on said open top of said container, said lid having an aperture therein, a hollow elongate substantially rigid member adaped to be passed through the aperture in said lid, means comprising embossed ridges on the external surface of said rigid member representing a recorded intelligible sound track, means formed on said lid adjacent said aperture for engaging said embossed ridge means so as to vibrate upon relative movement between said rigid member and said lid so that the recorded sound track is reproduced with said container providing a sound reproducing box, and means for reproducing the recorded sound track successively at varying pitches.

* * * * *